(12) United States Patent
Humphrey et al.

(10) Patent No.: US 11,266,948 B2
(45) Date of Patent: Mar. 8, 2022

(54) USE OF METAL ORGANIC FRAMEWORKS FOR H2O SORPTION

(71) Applicants: Board of Regents, The University of Texas System, Austin, TX (US); Korea Research Institute of Chemical Technology, Daejeon (KR)

(72) Inventors: Simon M. Humphrey, Austin, TX (US); Jong-San Chang, Daejeon (KR); Young Kyu Hwang, Daejeon (KR)

(73) Assignees: Board of Regents, The University of Texas System, Austin, TX (US); Korea Research Institute of Chemical Technology

(*) Notice: Subject to any disclaimer, the term of this patent is extended or adjusted under 35 U.S.C. 154(b) by 303 days.

(21) Appl. No.: 16/540,728

(22) Filed: Aug. 14, 2019

(65) Prior Publication Data

US 2020/0054991 A1    Feb. 20, 2020

Related U.S. Application Data

(60) Provisional application No. 62/718,826, filed on Aug. 14, 2018.

(51) Int. Cl.
*B01J 20/22* (2006.01)
*B01D 53/26* (2006.01)
(Continued)

(52) U.S. Cl.
CPC ......... *B01D 53/261* (2013.01); *B01D 53/047* (2013.01); *B01D 53/0462* (2013.01);
(Continued)

(58) Field of Classification Search
CPC .. B01D 53/04; B01D 53/0462; B01D 53/047; B01D 53/261; B01D 53/28;
(Continued)

(56) References Cited

U.S. PATENT DOCUMENTS 8,337,591 B2 * 12/2012 Zhou .................. C07F 1/005
95/90
10,183,235 B2   1/2019 Humphrey
(Continued)

FOREIGN PATENT DOCUMENTS

KR   10-2017-0093289 A   8/2017
WO        2004113227 A1   12/2004
WO        2016089686 A1   6/2016

*Primary Examiner* — Frank M Lawrence, Jr.
(74) *Attorney, Agent, or Firm* — Farhang Amini; Shackelford, Bowen, McKinley & Norton, LLP

(57) ABSTRACT

Embodiments of the present disclosure pertain to methods of sorption of $H_2O$ from an environment by associating the environment with a porous material such that the association results in the sorption of $H_2O$ to the porous material. The porous material includes a (M)-2,4-pyridinedicarboxylic acid coordination polymer, where M is a divalent metal ion selected from the group consisting of Mn, Fe, Co, Ni, Mg, and combinations thereof. The coordination polymer has a one-dimensional pore structure and shows reversible soft-crystal behavior. The porous material may be a Mg(II) 2,4-pyridinedicarboxylic acid coordination polymer (i.e., Mg-CUK-1). The methods of the present disclosure may also include one or more steps of releasing the sorbed $H_2O$ from the porous material and reusing the porous material after the releasing step for sorption of additional $H_2O$ from the environment.

14 Claims, 15 Drawing Sheets

(51) Int. Cl.
  *B01D 53/04* (2006.01)
  *B01D 53/047* (2006.01)
  *B01J 20/28* (2006.01)

(52) U.S. Cl.
  CPC ....... *B01J 20/226* (2013.01); *B01J 20/28011* (2013.01); *B01J 20/28061* (2013.01); *B01J 20/28064* (2013.01); *B01J 20/28071* (2013.01); *B01J 20/28073* (2013.01); *B01D 2253/204* (2013.01); *B01D 2253/306* (2013.01); *B01D 2253/311* (2013.01); *B01D 2257/80* (2013.01)

(58) Field of Classification Search
  CPC ........ B01D 2253/202; B01D 2253/204; B01D 2253/306; B01D 2253/311; B01D 2257/80; B01J 20/226; B01J 20/2804; B01J 20/28061; B01J 20/28064; B01J 20/2807; B01J 20/28073
  USPC ................ 95/117; 96/108; 34/80, 472, 473; 502/401
  See application file for complete search history.

(56) References Cited

U.S. PATENT DOCUMENTS

2012/0251438 A1   10/2012  Trukhan et al.
2013/0305922 A1*  11/2013  Matzger ............ B01D 53/0407
                                                    95/123
2015/0291870 A1*  10/2015  Van Horn ............... C07F 3/003
                                                     252/69

\* cited by examiner

USE OF METAL ORGANIC FRAMEWORKS FOR H2O SORPTION

CROSS-REFERENCE TO RELATED APPLICATIONS

This application claims priority to U.S. Provisional Patent Application No. 62/718,826, filed on Aug. 14, 2018. The entirety of the aforementioned application is incorporated herein by reference.

BACKGROUND

Current methods and materials for capturing $H_2O$ from an environment suffer from numerous limitations, including limited $H_2O$ adsorption capacity, irreversible adsorption, instability in the presence of moisture, and limited regeneration capacity. The $H_2O$ sorbents and $H_2O$ sorption methods of the present disclosure address these needs.

SUMMARY

In some embodiments, the present disclosure pertains to methods of sorption of $H_2O$ from an environment by associating the environment with a porous material such that the association results in the sorption of $H_2O$ to the porous material. Additional embodiments of the present disclosure pertain to the porous materials.

In some embodiments, the porous material includes a (M)-2,4-pyridinedicarboxylic acid coordination polymer, where M is a divalent metal ion selected from the group consisting of Mn, Fe, Co, Ni, Mg, and combinations thereof. In some embodiments, the coordination polymer has a one-dimensional pore structure and shows reversible soft-crystal behavior. In more specific embodiments, the porous material is a Mg(II) 2,4-pyridinedicarboxylic acid coordination polymer (also known as Mg-CUK-1). In additional embodiments, the porous material is a Mn(II) 2,4-pyridinedicarboxylic acid coordination polymer (also known as Mn-CUK-1).

In some embodiments, the methods of the present disclosure also include a step of releasing the sorbed $H_2O$ from the porous material. In some embodiments, the releasing occurs by decreasing the pressure or temperature of the environment. In some embodiments, the releasing occurs by placing the porous material in a second environment that has a different pressure or temperature than the environment where $H_2O$ sorption occurred.

In some embodiments, the methods of the present disclosure also include a step of reusing the porous material after the releasing step for sorption of additional $H_2O$ from the environment. In some embodiments, the porous materials may be utilized multiple times (e.g., over 100 times) without substantially affecting their $H_2O$ sorption capacities.

DETAILED DESCRIPTION

Figure 1:
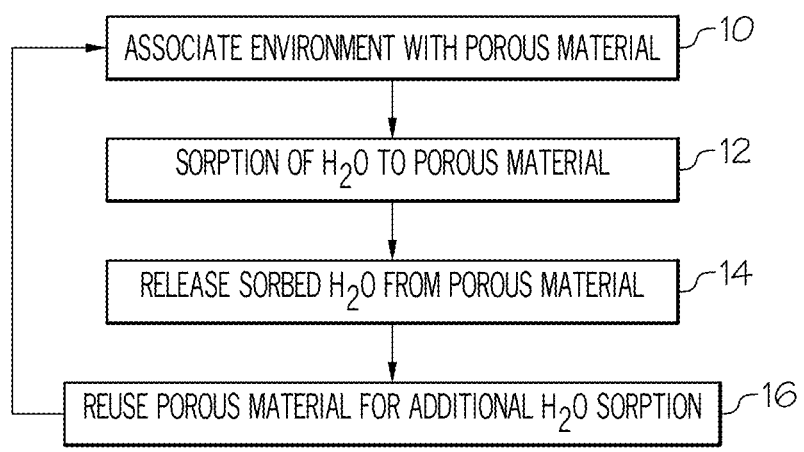
FIG. 1 provides a scheme of a method of sorption of water ($H_2O$) from an environment.
Figure 2:
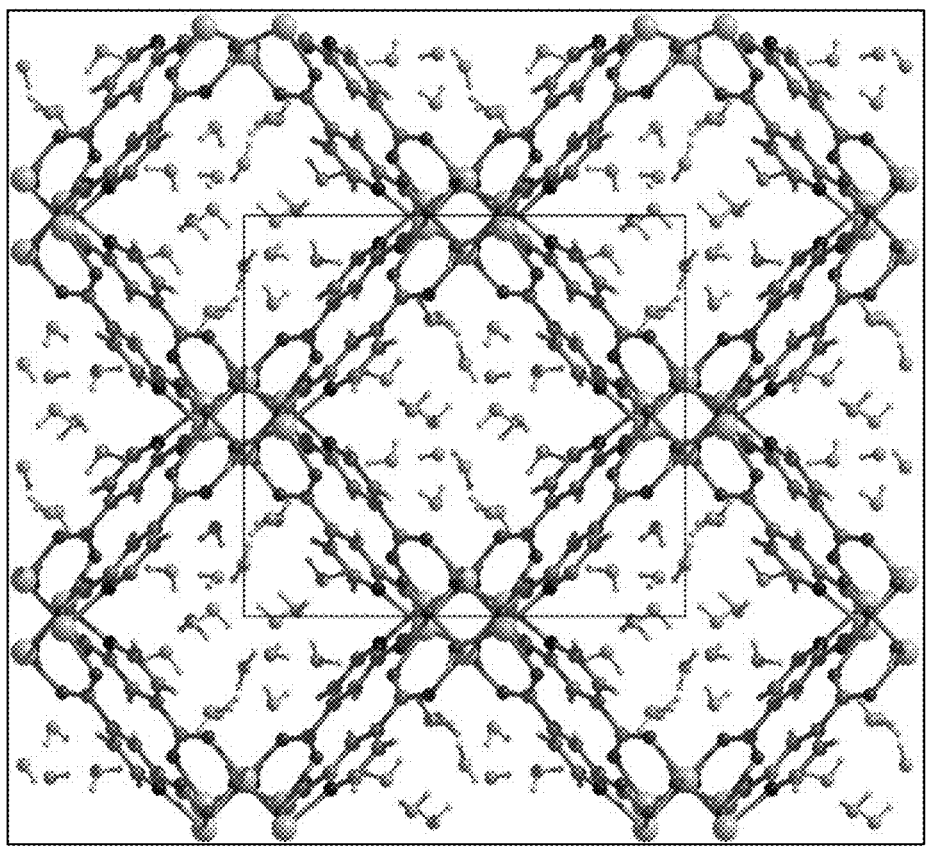
FIG. 2 provides an image of a Mg(II)-2,4-pyridinedicarboxylic acid coordination polymer (Mg-CUK-1) with adsorbed $H_2O$ molecules. The image is viewed down the crystallographic a-axis. The solvent O-atoms are drawn in yellow for clarity.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Current methods and materials for sorption of $H_2O$ from an environment suffer from numerous limitations. For instance, numerous metal organic frameworks have been utilized as desiccants. However, such metal organic frameworks have inconsistent and limited $H_2O$ adsorption properties, including limited H₂O adsorption capacities, irreversible adsorption, instability in the presence of moisture, and limited regeneration capacities (e.g., regeneration at temperatures at or above 100° C.).

For instance, US 2012/0251438A discloses the use of various metal organic frameworks for the separation or storage of gas phase moisture from the moisture content of natural gas. However, US 2012/0251438A at least failed to disclose the structures or the moisture adsorption isotherms of the metal organic frameworks. Furthermore, the limited data in US 2012/0251438A indicated that the moisture adsorption amount of the metal organic frameworks was low (e.g., about 12 wt %).

Similarly, WO 2004/113227A describes a zeolite as a dehumidifying apparatus. However, the zeolite in WO 2004/113227A demonstrates low moisture adsorption capacities, especially in environments with low relative humidity.

As such, a need exists for improved H₂O sorbents and H₂O sorption methods that can be used for the consistent sorption of H₂O in a reversible manner and at higher capacities. The H₂O sorbents and H₂O sorption methods of the present disclosure address these needs.

In some embodiments, the present disclosure pertains to methods of sorption of H₂O from an environment by utilizing various porous materials that include a (M)-2,4-pyridinedicarboxylic acid coordination polymer. Additional embodiments of the present disclosure pertain to porous materials that include a (M)-2,4-pyridinedicarboxylic acid coordination polymer.

In some embodiments illustrated in FIG. 1, the H₂O sorption methods of the present disclosure include a step of associating the environment with the porous material (step 10). In some embodiments, the associating results in the sorption of the H₂O to the porous material (step 12). In some embodiments, the methods of the present disclosure also include a step of releasing the sorbed H₂O from the porous material (step 14). In additional embodiments, the methods of the present disclosure also include a step of reusing the porous material after the releasing step for additional H₂O sorption (step 16).

As set forth in more detail herein, the H₂O sorption methods and the porous materials of the present disclosure have numerous embodiments. For instance, various methods may be utilized to associate various types of porous materials with various environments to result in the sorption of various amounts of H₂O from the environment. Moreover, the sorbed H₂O may be released from the porous materials in various manners.

Porous Materials

The present disclosure can utilize various types of porous materials. In some embodiments, the porous material is a (M)-2,4-pyridinedicarboxylic acid coordination polymer. In some embodiments, M is a divalent metal ion that includes, without limitation, Mn, Fe, Co, Ni, Mg, and combinations thereof. In some embodiments, M is a divalent metal ion that includes, without limitation, Mn, Fe, and combinations thereof. In some embodiments, the coordination polymer has a one-dimensional pore structure. In some embodiments, the coordination polymer shows reversible soft-crystal behavior.

In more specific embodiments, the porous material is a Mg(II) 2,4-pyridinedicarboxylic acid coordination polymer (also known as Mg-CUK-1). In some embodiments, Mg-CUK-1 contains one dimensional channels with square pore windows. Mg-CUK-1 was shown to be highly robust, owing to the presence of one-dimensional metal hydroxide chains that support a corrugated wall structure. In some embodiments, the $Mg^{II}$ centers in Mg-CUK-1 are octahedrally coordinated and bridge into chains of edge- and vertex sharing $Mg_3OH$ triangles. In some embodiments, the lattice connectivity of Mg-CUK-1 is identical to that of Co-CUK-1, but the space group of the as-synthesized material is different (e.g., $P2_1/c$ versus $C2/c$).

In some embodiments, the porous material is a Mn(II) 2,4-pyridinedicarboxylic acid coordination polymer (also known as Mn-CUK-1). In some embodiments, the porous material is a Fe(II) 2,4-pyridinedicarboxylic acid coordination polymer (also known as Fe-CUK-1). In some embodiments, the porous material is a Co(II) 2,4-pyridinedicarboxylic acid coordination polymer (also known as Co-CUK-1). In some embodiments, the porous material is a Ni(II) 2,4-pyridinedicarboxylic acid coordination polymer (also known as Ni-CUK-1). Additional porous materials can also be envisioned.

The porous materials of the present disclosure may be fabricated in various manners. Such fabrication methods were disclosed previously in Applicants' co-pending application no. PCT/US2015/062585 (filed on Nov. 25, 2015, and published as WO 2016/089686). For instance, in some embodiments, a reaction chamber containing metal (e.g., a Mg(II) complex) in water can be mixed with 2,4-pyridinedicarboxylic acid followed by cooling the reaction chamber to form a crystalline solid. Thereafter, the crystalline solid can be purified to form a porous metal coordination polymer. In some embodiments, the porous materials of the present disclosure may be fabricated by microwave-assisted heating.

The porous materials of the present disclosure may have various H₂O sorption capacities. For instance, in some embodiments, the porous materials of the present disclosure may have H₂O sorption capacities that range from about 10% to about 200% of the porous material weight. In some embodiments, the porous materials of the present disclosure may have an H₂O sorption capacity of about 50% to about 100% of the porous material weight. In some embodiments, the porous materials of the present disclosure may have an H₂O sorption capacity of about 20% to about 50% of the porous material weight. In some embodiments, the porous materials of the present disclosure may have an H₂O sorption capacity of about 20% to about 40% of the porous material weight. In some embodiments, the porous materials of the present disclosure may have an H₂O sorption capacity of about 27% to about 29% of the porous material weight. In some embodiments, the porous materials of the present disclosure may have an H₂O sorption capacity of about 30% to about 35% of the porous material weight.

In some embodiments, the porous materials of the present disclosure may have an H₂O sorption capacity of more than about 15% of the porous material weight. In some embodiments, the porous materials of the present disclosure may have an H₂O sorption capacity of more than about 20% of the porous material weight. In some embodiments, the porous materials of the present disclosure may have an H₂O sorption capacity of more than about 30% of the porous material weight. In some embodiments, the porous materials of the present disclosure may have an H₂O sorption capacity of more than about 50% of the porous material weight.

In some embodiments, the porous materials of the present disclosure may have an H₂O sorption capacity of about 35% of the porous material weight. In some embodiments, the porous materials of the present disclosure may have an H₂O sorption capacity of about 28% of the porous material weight. In some embodiments, the porous materials of the present disclosure may have an H₂O sorption capacity of about 22% of the porous material weight.

The porous materials of the present disclosure may have various surface areas. For instance, in some embodiments, the porous materials of the present disclosure have surface areas ranging from about 300 m$^2$/g to about 800 m$^2$/g. In some embodiments, the porous materials of the present disclosure have surface areas ranging from about 400 m$^2$/g to about 650 m$^2$/g. In some embodiments, the porous materials of the present disclosure have surface areas of about 403 m$^2$/g. In some embodiments, the porous materials of the present disclosure have surface areas of about 630 m$^2$/g.

The porous materials of the present disclosure may have various pore volumes. For instance, in some embodiments, the porous materials of the present disclosure have pore volumes ranging from about 0.1 cm$^3$/g to about 0.5 cm$^3$/g. In some embodiments, the porous materials of the present disclosure have pore volumes ranging from about 0.15 cm$^3$/g to about 0.25 cm$^3$/g. In some embodiments, the porous materials of the present disclosure have a pore volume of about 0.160 cm$^3$/g. In some embodiments, the porous materials of the present disclosure have a pore volume of about 0.224 cm$^3$/g.

The porous materials of the present disclosure may also have various densities. For instance, in some embodiments, the porous materials of the present disclosure have densities ranging from about 1 g/cm$^3$ to about 2 g/cm$^3$. In some embodiments, the porous materials of the present disclosure have densities ranging from about 1.2 g/cm$^3$ to about 1.5 g/cm$^3$. In some embodiments, the porous materials of the present disclosure have densities of about 1.2 g/cm$^3$. In some embodiments, the porous materials of the present disclosure have densities of about 1.5 g/cm$^3$.

The porous materials of the present disclosure may be in various states. For instance, in some embodiments, the porous materials of the present disclosure may be in a solid state. In some embodiments, the porous materials of the present disclosure may be in a gaseous state. In some embodiments, the porous materials of the present disclosure may be in a liquid state.

Environments

The methods of the present disclosure may be utilized for sorption of $H_2O$ from various environments. In some embodiments, environments generally include environments that require desiccation, water removal, moisture removal, or combinations of such treatments. In some embodiments, the environment includes, without limitation, moisture control devices, heat transfer devices, light emitting devices, thermal pumps, batteries, gas streams, wells, and combinations thereof. In some embodiments, the porous materials of the present disclosure may be a component of one or more of the aforementioned devices or structures.

In some embodiments, the environment may be an atmosphere. In some embodiments, the atmosphere may include, without limitation, a troposphere, a stratosphere, a mesosphere, a thermosphere, an exosphere, or combinations thereof. In some embodiments, the environment may be an isolated sample, such as a sample isolated from an atmosphere, a gas source, or a water source.

In some embodiments, the environment includes moisture control devices. In some embodiments, the moisture control devices include, without limitation, dehumidifiers, humidifiers, dryers, and combinations thereof.

In some embodiments, the environment includes heat transfer devices. In some embodiments, the heat transfer devices include, without limitation, water adsorption-driven chillers, heat pumps, air conditioners, heaters, refrigerators, freezers, and combinations thereof. In some embodiments, the environment includes water adsorption-driven chillers.

In some embodiments, the environment includes light emitting devices. In some embodiments, the light emitting devices include, without limitation, solar energy panels, geothermic devices, waste heat driving adhesion type devices, secondary battery devices, and combinations thereof.

$H_2O$ molecules may be present in an environment in various forms. For instance, in some embodiments, the $H_2O$ present in the environment is in a gaseous phase. In some embodiments, the $H_2O$ present in the environment is in a liquid phase. In some embodiments, the $H_2O$ present in the environment is in a liquid phase and a gaseous phase.

Association of Porous Materials with an Environment

Various methods may be utilized to associate the porous materials of the present disclosure with an environment. For instance, in some embodiments, the association of the porous materials with an environment occurs by flowing the environment through a structure that contains the porous materials. In some embodiments, the structure may be a column or a sheet that contains immobilized porous materials.

In some embodiments, the association of the porous materials with an environment occurs by placing the porous materials at or near the environment. In some embodiments, such placement occurs by various methods that include, without limitation, adhesion, immobilization, clamping, and embedding. Additional methods by which to associate porous materials with an environment can also be envisioned.

The porous materials of the present disclosure may be associated with an environment at various temperatures. For instance, in some embodiments, the association can occur at room temperature. In some embodiments, the association can occur at about 30° C. In some embodiments, the association can occur at temperatures of less than about 150° C. In some embodiments, the association can occur at temperatures of less than about 100° C.

The porous materials of the present disclosure may also be associated with an environment at various pressures. For instance, in some embodiments, the association can occur at atmospheric pressure. In some embodiments, the association can occur at partial pressures ($P/P_0$) ranging from 0 to 1, where $P_0$ represents a saturated vapor pressure at an association temperature, and where P represents a vapor pressure upon association. In some embodiments, the association can occur at partial pressures ($P/P_0$) ranging from 0.1 to 0.5. In some embodiments, the association can occur at partial pressures ($P/P_0$) ranging from 0 to 0.3. In some embodiments, the association occurs at partial pressures ($P/P_0$) of less than 0.3. In some embodiments, the association occurs at partial pressures ($P/P_0$) of less than 0.25. In some embodiments, the association occurs at partial pressures ($P/P_0$) of less than 0.2.

The porous materials of the present disclosure may also be associated with an environment under various humidities. For instance, in some embodiments, the association occurs at relative humidities of more than 5%. In some embodiments, the association occurs at relative humidities of more than 10%. In some embodiments, the association occurs at relative humidities of more than 15%. In some embodiments, the association occurs at relative humidities of more than 20%. In some embodiments, the association occurs at relative humidities of more than 25%. In some embodiments, the association occurs at relative humidities of more than 30%. In some embodiments, the association occurs at relative humidities of more than 35%. In some embodiments, the association occurs at relative humidities of more than 40%. In some embodiments, the association occurs at relative humidities of more than 45%. In some embodiments, the association occurs at relative humidities of more than 50%. In some embodiments, the association occurs at relative humidities of more than 55%. In some embodiments, the association occurs at relative humidities of more than 60%.

$H_2O$ Sorption to Porous Materials

The sorption of $H_2O$ to the porous materials of the present disclosure can occur in various manners. For instance, in some embodiments, the sorption of the $H_2O$ to the porous materials occurs by at least one of absorption, adsorption, ion exchange, ionic interactions, physisorption, chemisorption, hydrogen bonding, van der Waals interactions, and combinations thereof. In some embodiments, the sorption of the $H_2O$ to the porous materials occurs by adsorption.

In some embodiments, the sorption of the $H_2O$ to the porous materials occurs by hydrogen bonding. In some embodiments, the $H_2O$ is sorbed in an ordered manner within the one-dimensional pore structure of the coordination polymers of the porous material. In some embodiments, the $H_2O$ is sorbed in the form of single chain hydrogen bonded $H_2O$ molecules. In some embodiments, the single chain hydrogen bonded $H_2O$ molecules form pentameric drums.

The porous materials of the present disclosure may have various amounts of sorbed $H_2O$. For instance, in some embodiments, the porous material: sorbed $H_2O$ molar ratio ranges from about 0.1 to 10. In some embodiments, the porous material: sorbed $H_2O$ molar ratio ranges from about 1 to 10. In some embodiments, the $H_2O$ sorption capacities of the porous materials represent the amounts of sorbed $H_2O$.

Release of Sorbed $H_2O$

In some embodiments, the methods of the present disclosure also include a step of releasing sorbed $H_2O$ from porous materials. Various methods may be utilized to release $H_2O$ from porous materials. For instance, in some embodiments, the releasing occurs by decreasing the pressure of the environment. In some embodiments, the pressure of the environment is reduced to atmospheric pressure or below atmospheric pressure.

In some embodiments, the releasing occurs by placing the porous material in a second environment that has a lower pressure than the environment where $H_2O$ sorption occurred. In some embodiments, the second environment may be at or below atmospheric pressure. In some embodiments, the releasing occurs spontaneously as the environmental pressure decreases.

The release of sorbed $H_2O$ from porous materials can also occur at various temperatures. In some embodiments, the release occurs at ambient temperature. In some embodiments, the release occurs at the same temperature at which $H_2O$ sorption occurred. In some embodiments, the releasing occurs without heating the porous materials. Therefore, in some embodiments, a temperature swing is not required to release sorbed $H_2O$ from porous materials.

In some embodiments, release of sorbed $H_2O$ from porous materials occurs by decreasing the temperature of the environment. In some embodiments, the releasing occurs by placing the porous material in a second environment that has a lower temperature than the environment where $H_2O$ sorption occurred.

In some embodiments, release of sorbed $H_2O$ from porous materials occurs by increasing the temperature of the environment. In some embodiments, the releasing occurs by placing the porous material in a second environment that has a higher temperature than the environment where $H_2O$ sorption occurred.

In some embodiments, release of sorbed $H_2O$ from porous materials occurs at temperatures of 150° C. or lower. In some embodiments, release of sorbed $H_2O$ from porous materials occurs at temperatures of 100° C. or lower. In some embodiments, release of sorbed $H_2O$ from porous materials occurs at temperatures of 80° C. or lower. In some embodiments, release of sorbed $H_2O$ from porous materials occurs at room temperature.

Various amounts of $H_2O$ may be released from porous materials during a releasing step. For instance, in some embodiments, more than 50% of the sorbed $H_2O$ is released during the releasing step. In some embodiments, more than 80% of the sorbed $H_2O$ is released during the releasing step.

Reuse of the Porous Materials

In some embodiments, the methods of the present disclosure also include a step of reusing the porous materials after $H_2O$ release for sorption of more $H_2O$ from an environment. In some embodiments, the porous materials of the present disclosure may be reused multiple times without substantially affecting their $H_2O$ sorption capacities.

For instance, in some embodiments, the porous materials of the present disclosure may be reused over 10 times without substantially affecting their $H_2O$ sorption capacities. In some embodiments, the porous materials of the present disclosure may be reused over 50 times without substantially affecting their $H_2O$ sorption capacities. In some embodiments, the porous materials of the present disclosure may be reused over 100 times without substantially affecting their $H_2O$ sorption capacities. In some embodiments, the porous materials of the present disclosure may be reused over 500 times without substantially affecting their $H_2O$ sorption capacities.

In some embodiments, the $H_2O$ sorption capacities of the porous materials of the present disclosure remain at 100% their original value after multiple cycles of $H_2O$ sorption and release. In some embodiments, the $H_2O$ sorption capacities of the porous materials of the present disclosure remain at 95% their original value after multiple cycles of $H_2O$ sorption and release. In some embodiments, the $H_2O$ sorption capacities of the porous materials of the present disclosure remain at 90% their original value after multiple cycles of $H_2O$ sorption and release. In some embodiments, the $H_2O$ sorption capacities of the porous materials of the present disclosure remain at 85% their original value after multiple cycles of $H_2O$ sorption and release.

Advantages and Applications

The $H_2O$ sorption methods of the present disclosure provide numerous advantages over prior $H_2O$ sorption methods. In particular, the porous materials of the present disclosure provide significantly higher $H_2O$ sorption capacities than traditional $H_2O$ sorbents.

Furthermore, the porous materials of the present disclosure have the ability to adsorb and desorb $H_2O$ almost reversibly under physical parameters that are superior to materials currently used as desiccants (e.g., SAPO-34). In particular, unlike traditional $H_2O$ sorbents (e.g., SAPO-34), the porous materials of the present disclosure can be spontaneously regenerated through lowering pressure or temperature. As such, the porous materials of the present disclosure can provide higher $H_2O$ sorption efficiencies with lower energy penalties upon regeneration. This in turn leads to savings in terms of costs and energy.

Accordingly, the $H_2O$ sorption methods of the present disclosure can find numerous applications. For instance, in some embodiments, the $H_2O$ sorption methods of the present disclosure can be utilized for the sorption of $H_2O$ from numerous environments, such as environments that require dehumidification (e.g., water sorption-driven chiller/heat pumps and thermal batteries).

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Use of CUK-1 in Capturing Moisture from Various Environments

In this Example, Applicants demonstrate that Co-CUK-1, Ni-CUK-1 and Mg-CUK-1 are stable absorbers of moisture, especially when compared with organic and inorganic hybrid nanoporous materials.

Example 1.1. $H_2O$ Adsorption Characteristics of Co-CUK-1

Co-CUK-1 was synthesized by adding an aqueous solution of KOH (1M) and pyridine 2,4-dicarboxylic acid (1 mmol) to an aqueous solution (1.5 mmol) of $CoCl_2.6H_2O$. The solution was placed in a stainless steel autoclave and heated for 18 hours at 200° C. The precipitated Co-CUK-1 was then filtered and dried in an oven for about 12 hours.

In Co-CUK-1, it was observed that the organic ligands are coordinated with five different Co metal ions and the core metal is coupled through three bridging interactions (the chelating carboxylate, the monomer atom hydroxyl group bridge inclusion in the 4-carboxylate bridge, and the edge of the vertex). Moreover, as observed from a monocrystal construction analysis, Co-CUK-1 has a one-dimensional diamond shape channel, where water is within the micropores of the crystalline structure.

Figure 3:
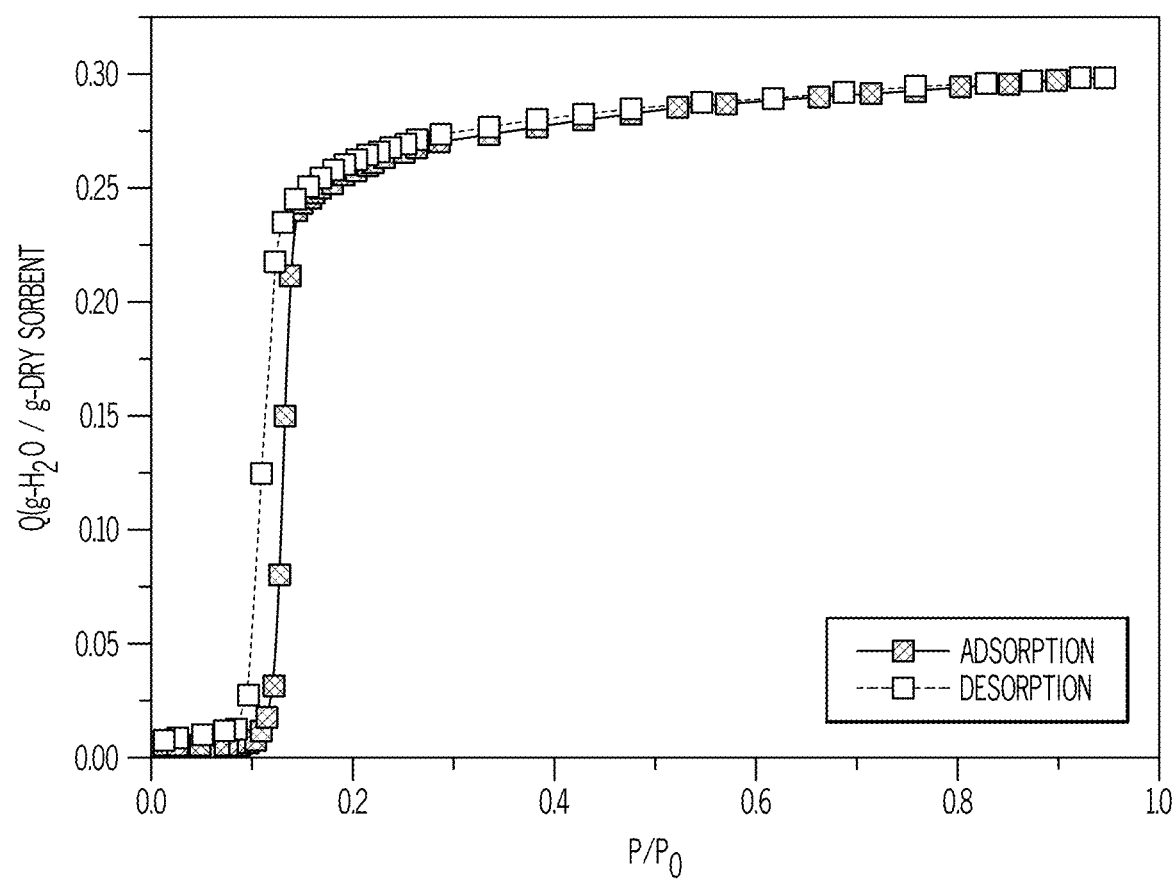
FIG. 3 shows water adsorption-desorption isotherms of Co-CUK-1.

The moisture adsorption property of Co-CUK-1 was measured by using a TGA gravimetric analysis adsorption device. The vapor pressure adsorption and desorption isotherm was measured at a relative vapor pressure $P/P_0$ that ranged from 0 to 1.0. As shown in FIG. 3, the moisture desorption isotherm of Co-CUK-1 had a reversible isotherm, which reached saturation at a relative pressure $(P/P_0)$ of about 0.20. In addition, the maximum $H_2O$ adsorption capacity was about 0.3 g $H_2O$ per 1 g of Co-CUK-1 at a relative pressure of about 1.

In contrast, a NaX zeolite reached saturation at a relative pressure $(P/P_0)$ of about 0.05. In addition, the maximum $H_2O$ adsorption capacity of the zeolite was about 0.22 g $H_2O$ per 1 g of NaX at a relative pressure of about 1. Moreover, the NaX zeolite required a regeneration temperature of more than 150° C.

Figure 4:
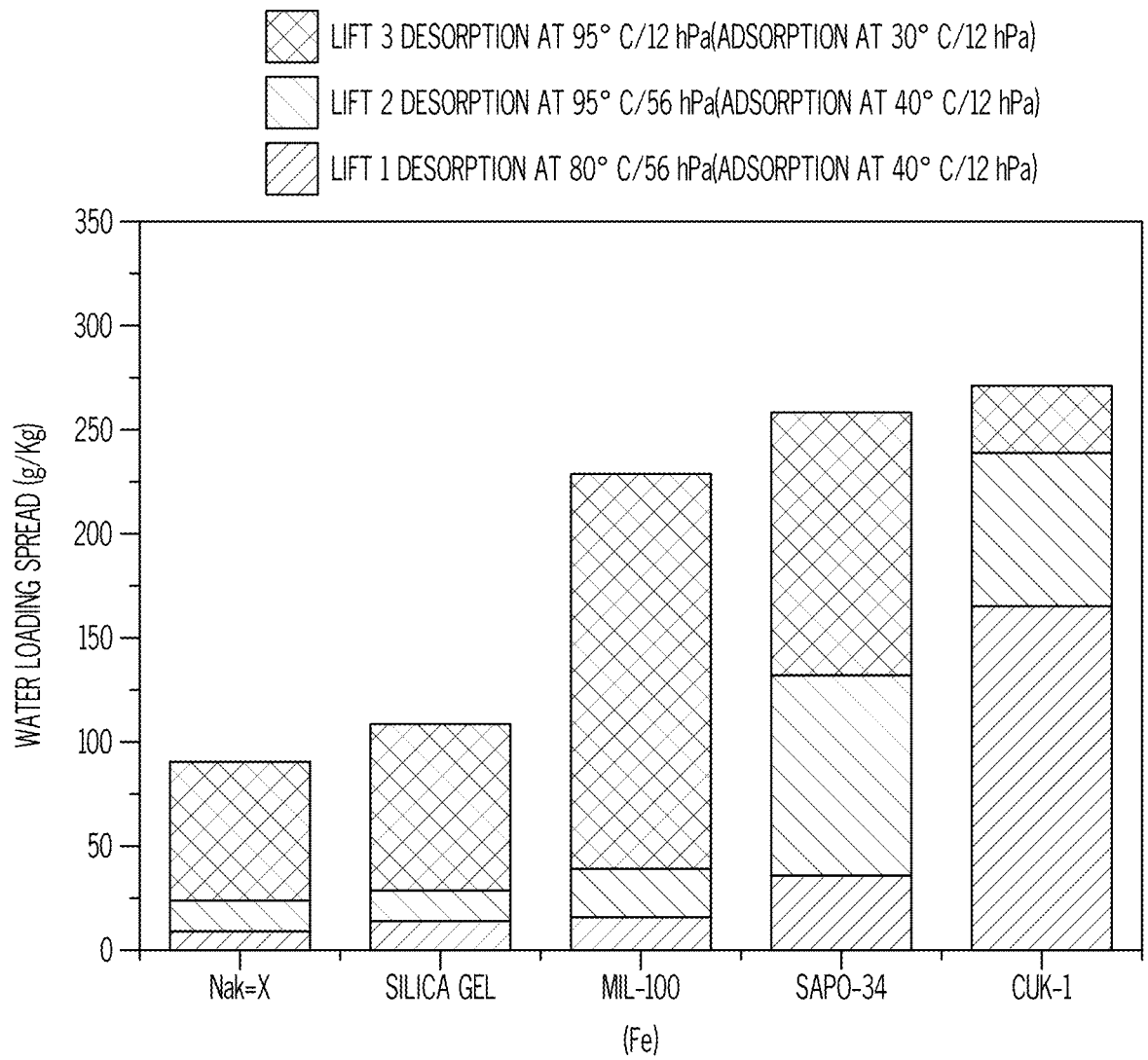
FIG. 4 is a moisture detachment capacity that compares the low temperature regeneration capacities of Co-CUK-1 to several existing adsorbents, including NaX, silica gel, and silico aluminophosphate (SAPO-34).

FIG. 4 provides a more detailed comparison of the $H_2O$ adsorption capacities of different adsorbents. The comparison illustrates that the moisture absorption-desorption characteristics of Co-CUK-1 was superior to the other commercial adsorbents, such as SAPO-34 and NaX.

Figure 5:
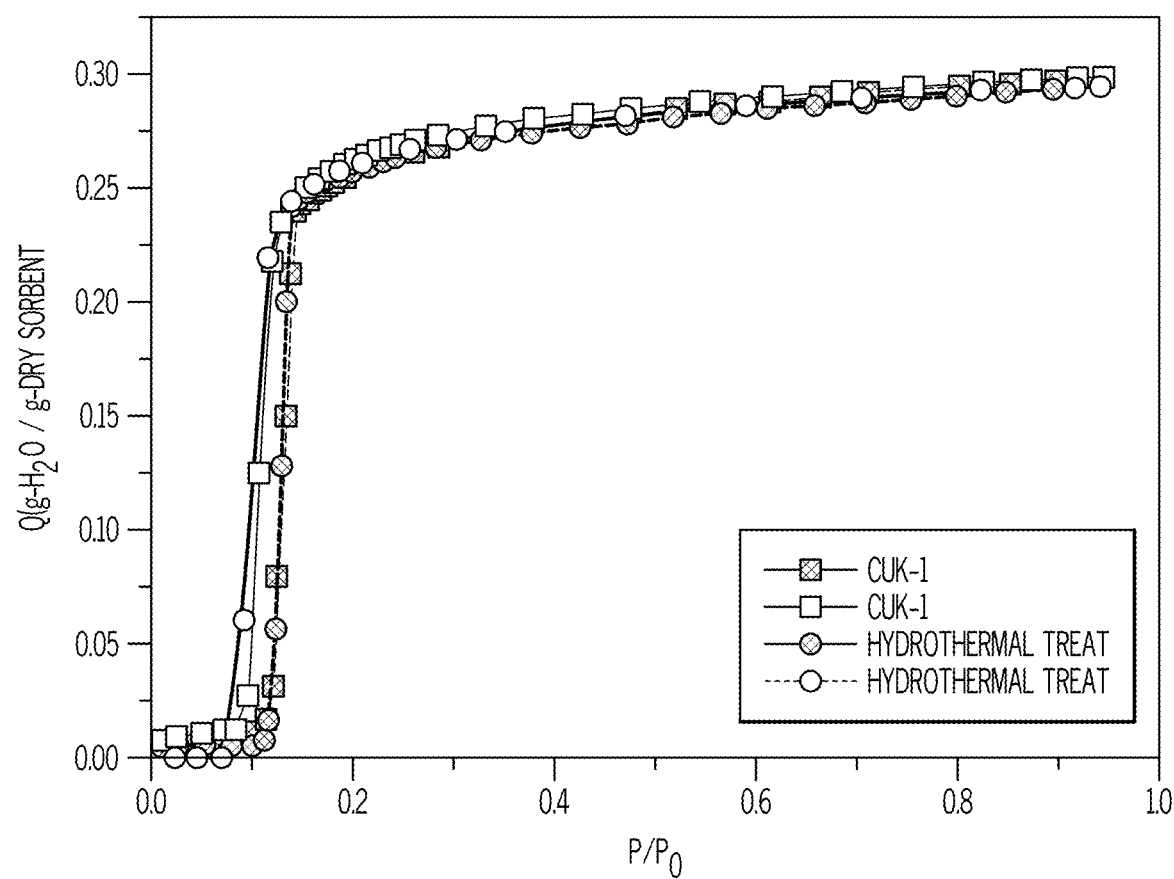
FIG. 5 shows water adsorption-desorption isotherms analyzing the hydrothermal stability of Co-CUK-1.

FIG. 5 demonstrates that Co-CUK-1 has optimal hydrothermal stability. Co-CUK-1 was exposed to boiling water of 100° C. for about 1 hour. No structural collapse was observed. Furthermore, as shown in the water adsorption isotherm in FIG. 5, no significant change in water adsorption capacity was observed after the hydrothermal treatment. Such results demonstrate that Co-CUK-1 has high durability and reusability.

Example 1.2. $H_2O$ Adsorption Characteristics of Ni-CUK-1

Figure 6:
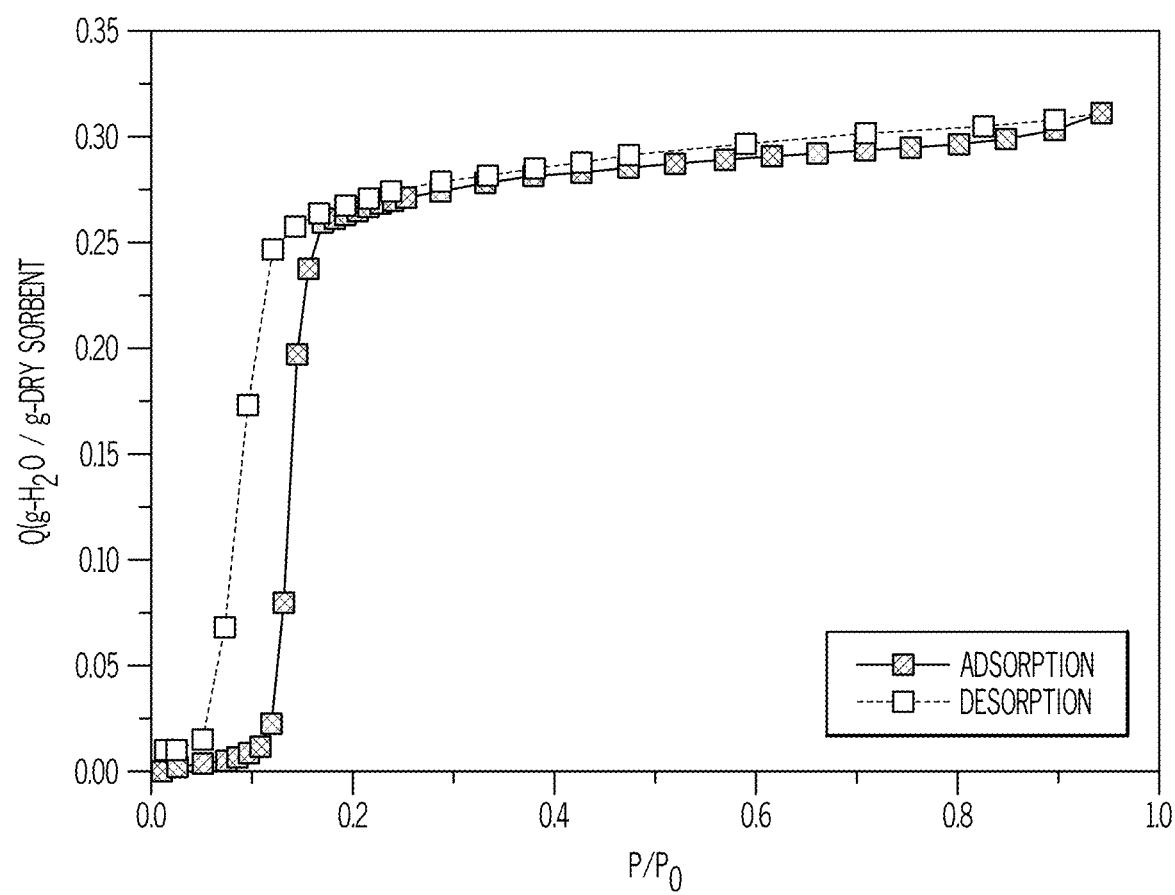
FIG. 6 shows water adsorption-desorption isotherms of Ni-CUK-1.

Ni-CUK-1 was synthesized by the same method outlined in Example 1.1. The obtained surface area and pore volume of the synthesized Ni-CUK-1 were 630 $m^2/g$ and 0.224 $cm^3/g$, respectively. The moisture adsorption properties of Ni-CUK-1 was measured to be the same as Co-CUK-1 in Example 1.1. In particular, as shown in the moisture desorption isotherm in FIG. 6, Ni-CUK-1 had a reversible isotherm, which reached saturation at a relative pressure $(P/P_0)$ of about 0.22. In addition, the maximum $H_2O$ adsorption capacity was about 0.3 g $H_2O$ per 1 g of Ni-CUK-1 at a relative pressure of about 1.

Example 1.3. $H_2O$ Adsorption Characteristics of Mg-CUK-1

Figure 7:
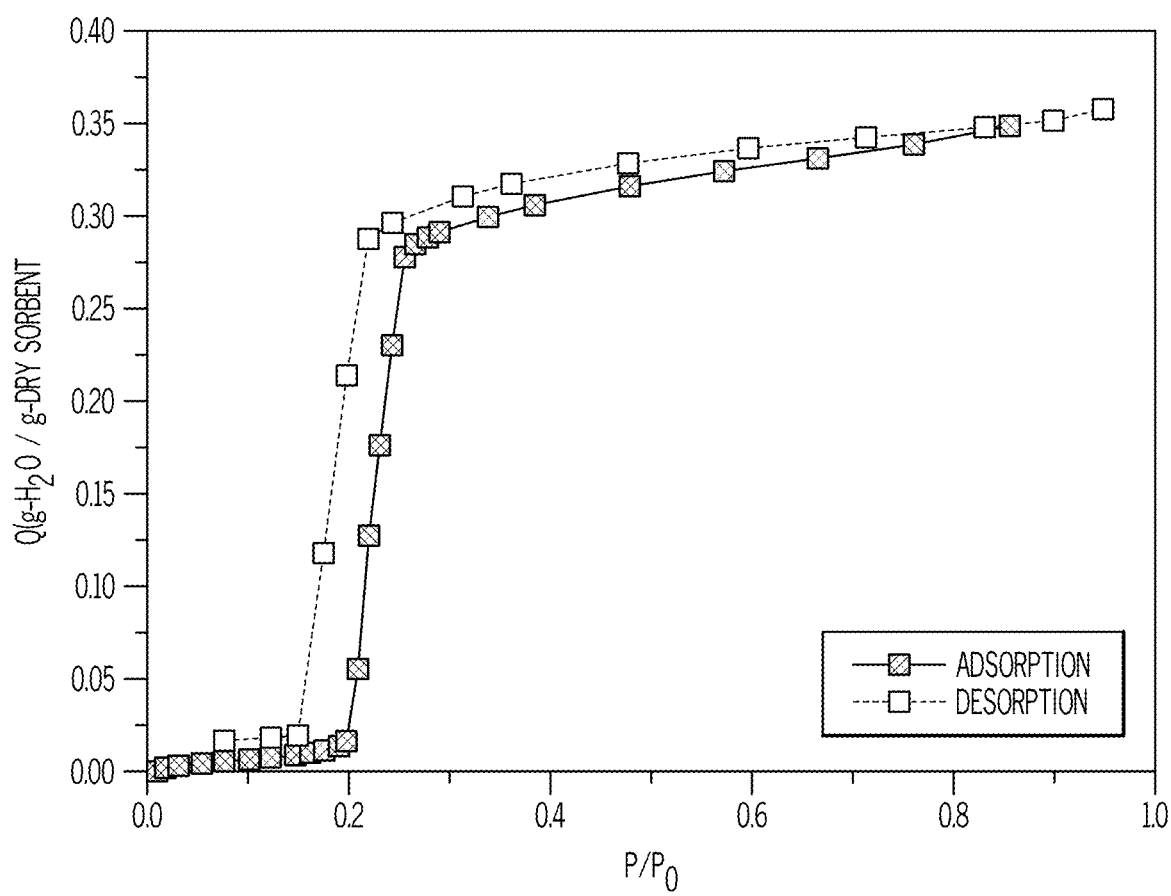
FIG. 7 shows water adsorption-desorption isotherms of Mg-CUK-1.

Mg-CUK-1 was synthesized by the same method outlined in Example 1.1. The obtained surface area and pore volume of the synthesized Mg-CUK-1 were 403 $m^2/g$ and 0.160 $cm^3/g$, respectively. The moisture adsorption properties of Mg-CUK-1 were also measured to be the same as Co-CUK-1 and Ni-CUK-1 in Examples 1.1 and 1.2, respectively. In particular, as shown in the moisture desorption isotherm in FIG. 7, Mg-CUK-1 had a reversible isotherm, which reached saturation at a relative pressure $(P/P_0)$ of about 0.20. In addition, the maximum $H_2O$ adsorption capacity was about 0.35 g $H_2O$ per 1 g of Ni-CUK-1 at a relative pressure of about 1.

Example 1.4. Water Adsorption-Desorption Properties of CUK-1

Figure 8:
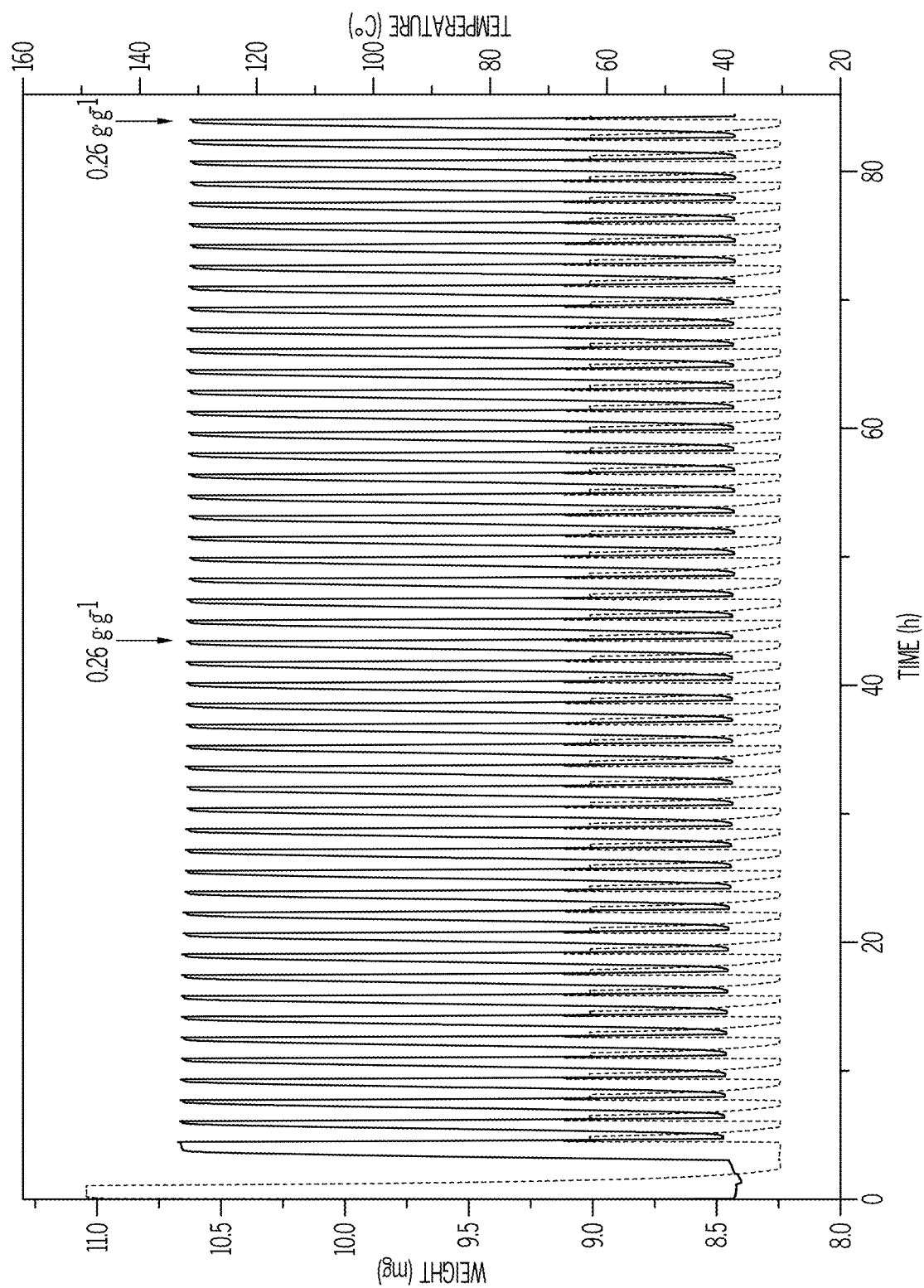
FIG. 8 shows the thermogravimetric analysis profile for 50 cycles of water adsorption-desorption of Co-CUK-1.

FIG. 8 shows the thermogravimetric analysis profile for 50 cycles of water adsorption-desorption of Co-CUK-1. Adsorption occurred at 30° C. in humid nitrogen (RH 35%) and desorption occurred at 63° C. in nitrogen with low humidity (RH 6%). Prior to the multiple cycle experiment, the first cycle was carried out by a different condition such that Co-CUK-1 is dehydrated at 150° C. for 1 hour in dry $N_2$, hydrated at 30° C. in humid nitrogen (RH 35%), and then dehydrated again at 63° C. in nitrogen with low humidity (RH 6%). The highly reversible cyclability test data shows a negligible difference in working capacity between consecutive cycles, indicating a very high cycling durability of Co-CUK-1. This result clearly highlights the energy-efficient water sorption properties of Co-CUK-1, which is suitable for facile dehydration below 70° C.

Figure 9:
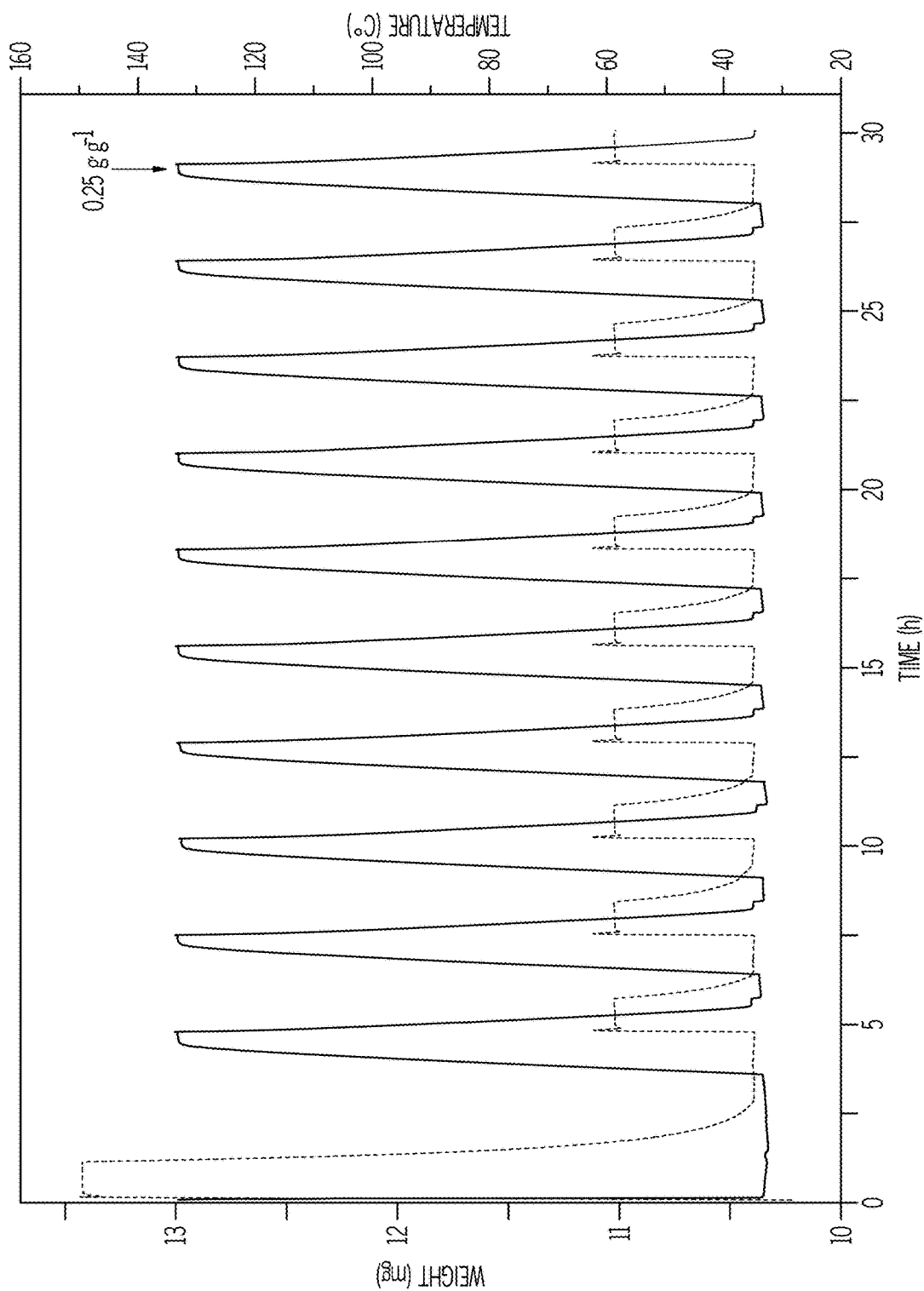
FIG. 9 shows the thermogravimetric analysis profile for 10 cycles of water adsorption-desorption of Ni-CUK-1.

FIG. 9 shows the thermogravimetric analysis profile for 10 cycles of water adsorption-desorption of Ni-CUK-1. Adsorption occurred at 30° C. in humid nitrogen (RH 35%) and desorption occurred at 55° C. in nitrogen with low humidity (RH 6%). Prior to the multiple cycle experiment, the first cycle was carried out by a different condition such that Ni-CUK-1 is dehydrated at 150° C. for 1 hour in dry $N_2$, hydrated at 30° C. in humid nitrogen (RH 35%), and then dehydrated again at 55° C. in nitrogen with low humidity (RH 6%). This result highlights the energy-efficient water sorption properties of Ni-CUK-1.

Figure 10:
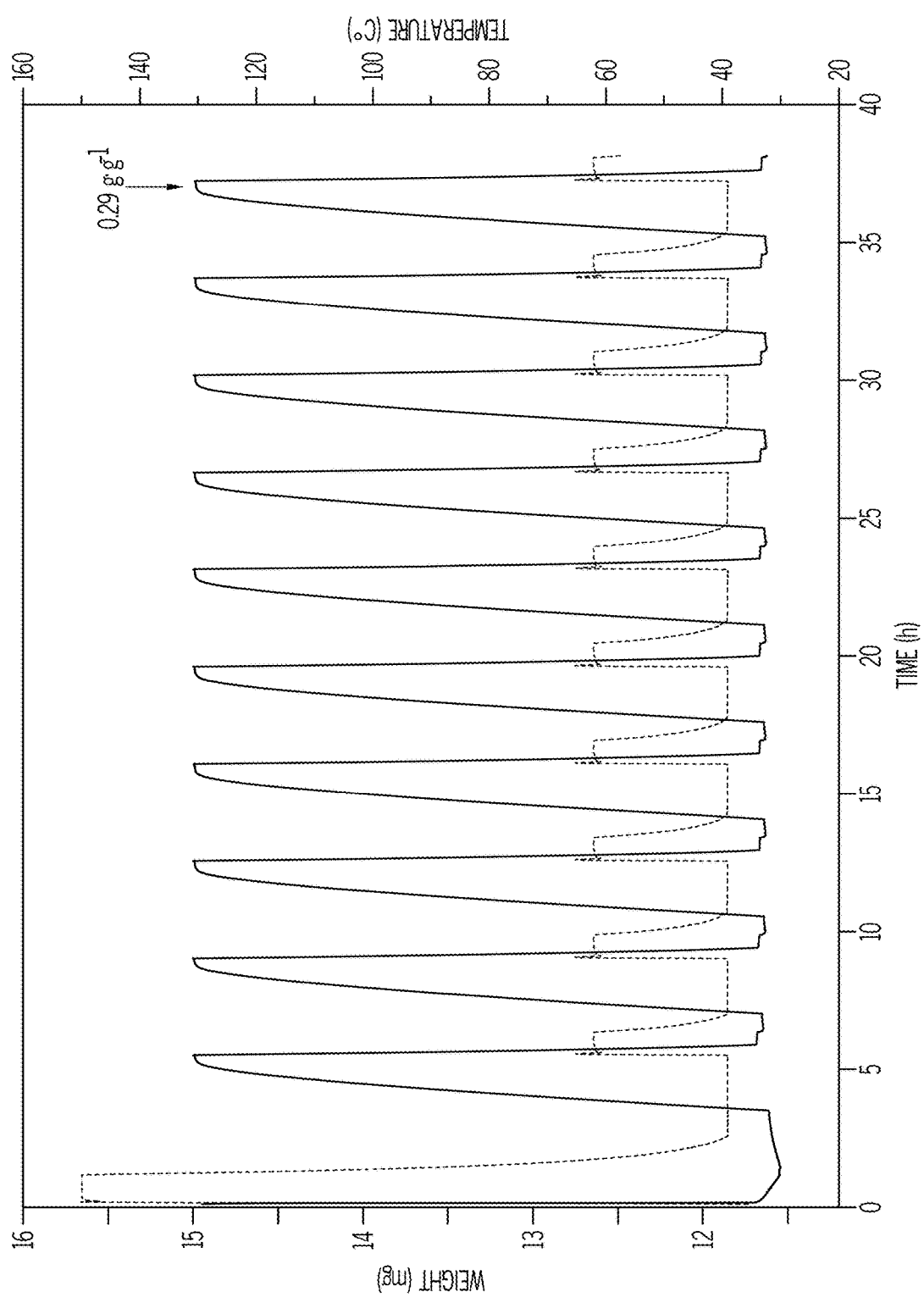
FIG. 10 shows the thermogravimetric analysis profile for 10 cycles of water adsorption-desorption of Mg-CUK-1.

FIG. 10 shows the thermogravimetric analysis profile for 10 cycles of water adsorption-desorption of Mg-CUK-1. Adsorption occurred at 30° C. in humid nitrogen (RH 35%) and desorption occurred at 55° C. in nitrogen with low humidity (RH 6%). Prior to the multiple cycle experiment, the first cycle was carried out by a different condition such that Mg-CUK-1 is dehydrated at 150° C. for 1 hour in dry $N_2$, hydrated at 30° C. in humid nitrogen (RH 35%), and then dehydrated again at 55° C. in nitrogen with low humidity (RH 6%). This result reveals the hydrothermal stability of Mg-CUK-1 under multiple cyclic conditions.

Example 1.5. Heat Transfer and Weight Loss Properties of CUK-1

Figure 11:
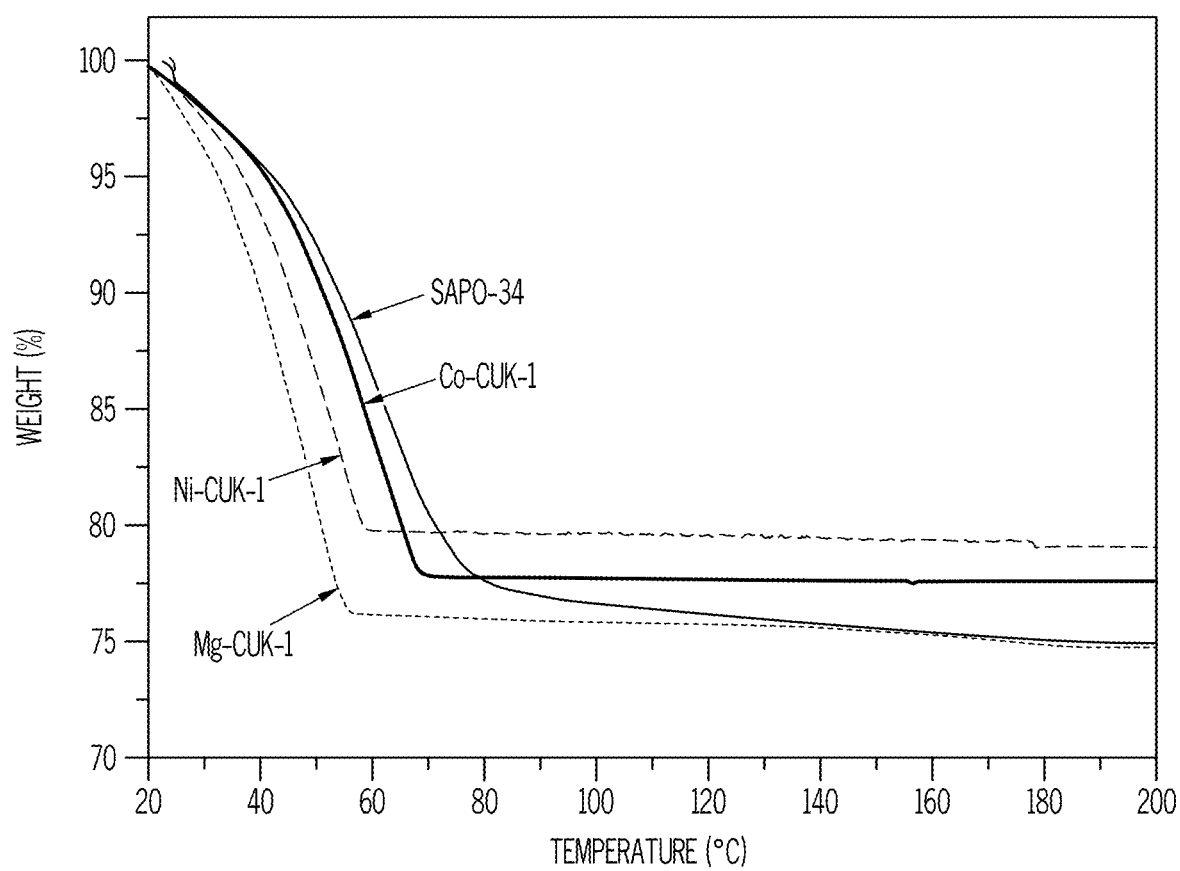
FIG. 11 shows the thermogravimetric analysis (TGA) weight loss profiles of fully hydrated CUK-1 and SAPO-34 under a dry $N_2$ flow.

FIG. 11 shows the TGA weight loss profiles of fully hydrated CUK-1 and SAPO-34 under a dry $N_2$ flow. The carrier gas flow rate was 30 ml/min. The ramping rate was 2° C./min.

Figure 12:
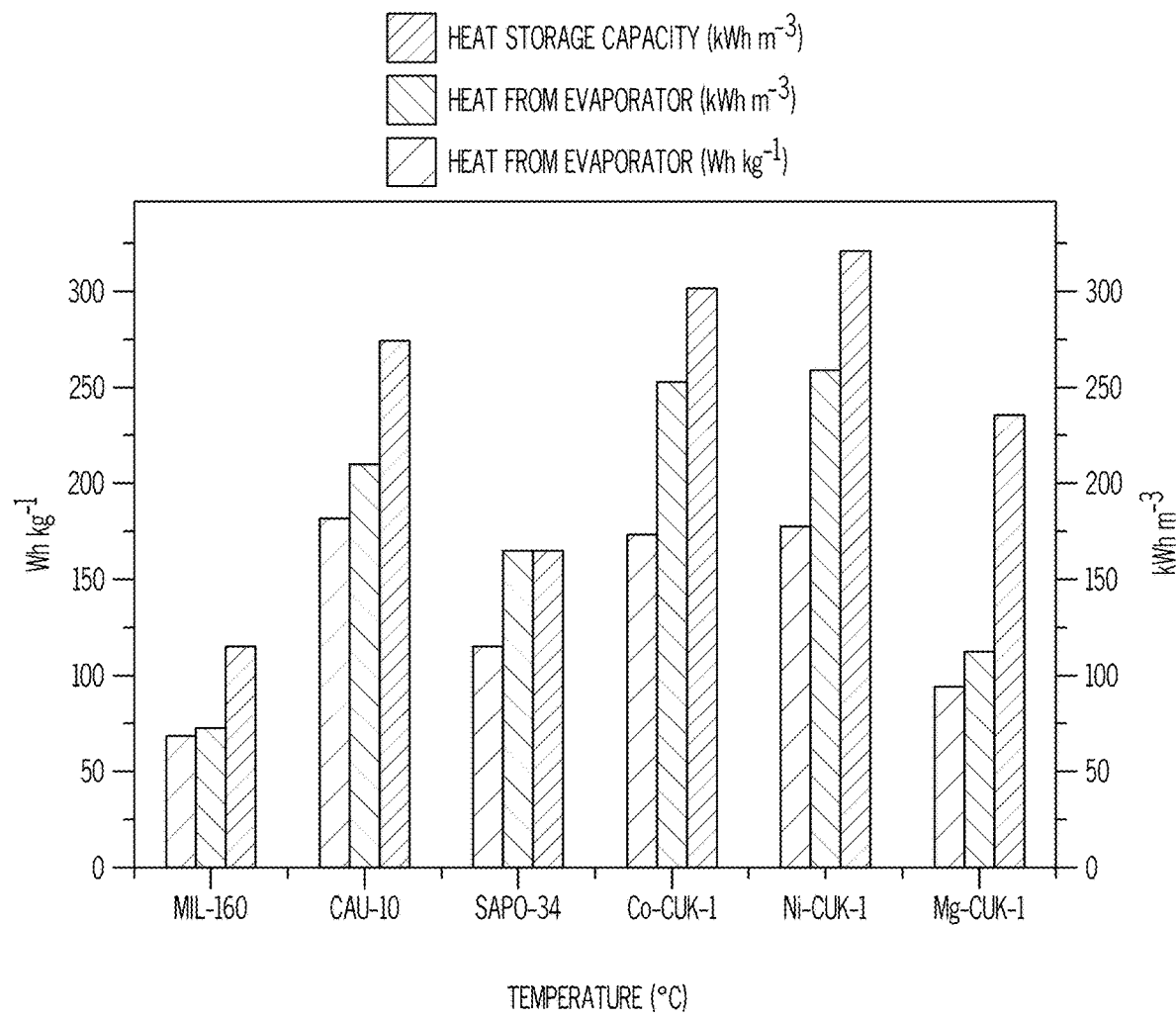
FIG. 12 shows gravimetric and volumetric heat from evaporator, and heat storage capacities calculated for M-CUK-1 and benchmark water adsorbents. Boundary conditions: heat transferred from the evaporator in one refrigeration cycle at $T_{ev}$=5° C., $T_{con}$=30° C., and $T_{des}$=70° C.; energy storage capacity per unit weight or volume of adsorbent at $T_{ev}$=10° C., $T_{con}$=30° C., and $T_{des}$=70° C.

FIG. 12 shows gravimetric and volumetric heat from an evaporator, and heat storage capacities calculated for M-CUK-1 and three benchmark water adsorbents in one refrigeration cycle as a function of temperature lift. The benchmark water adsorbents include SAPO-34 zeolite, aluminum-2,5-furandicarboxylate MIL-160, and aluminum isophthalate CAU-10-H. This graph was obtained by thermodynamic calculations using a method derived by De Lange et al. (*Chemical Reviews*, 115 (2015) 12205). For the calculations, boundary conditions of the refrigeration cycle were fixed at $T_{ev}$=5° C., $T_{on}$=30° C., and $T_{des}$=70° C. for heat transferred from the evaporator; $T_{e}v$=10° C., $T_{Con}$=30° C., and $T_{des}$=70° C. for energy storage capacity per unit weight or volume of adsorbent, where $T_{ev}$, $T_{Con}$, and $T_{des}$ are temperatures of evaporation, condensation, and desorption, respectively. These values confirm that Co-CUK-1 and Ni-CUK-1 outperform SAPO-34 for heat transfer applications.

Figure 13:
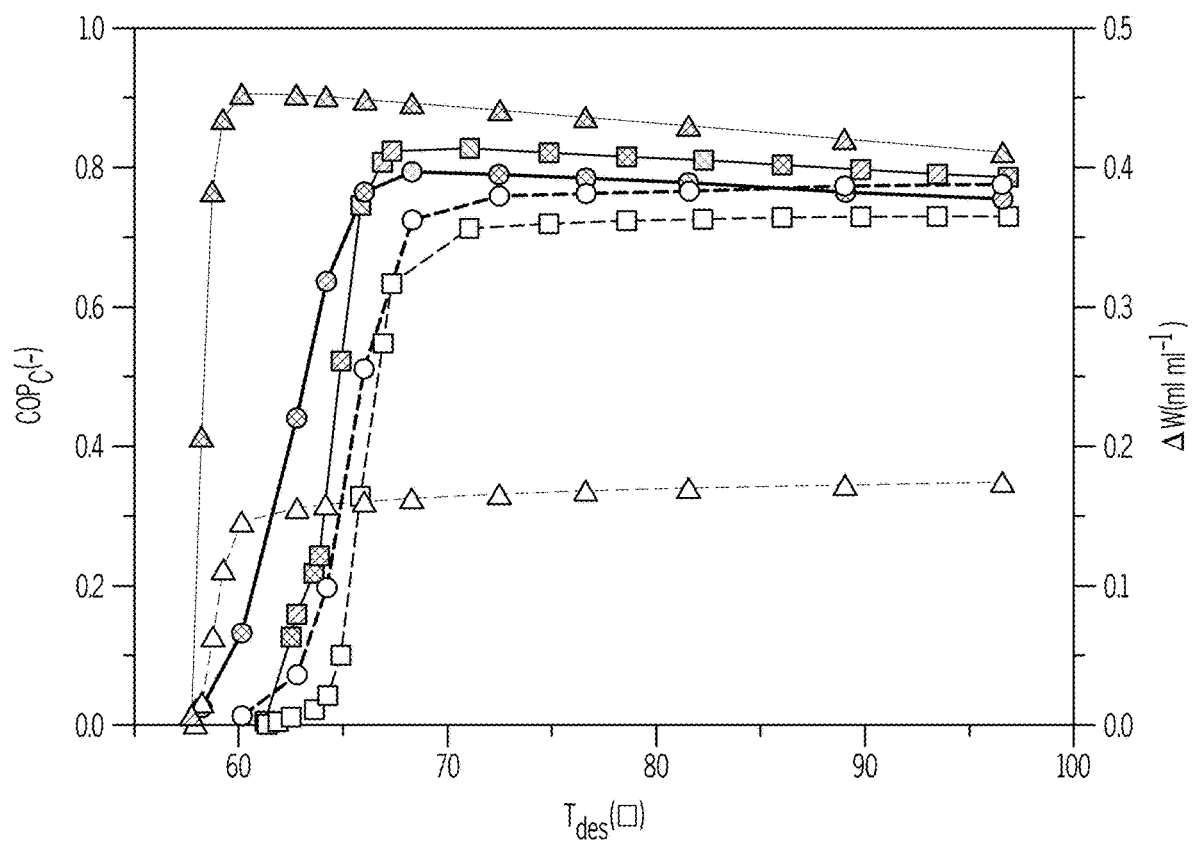
FIG. 13 shows coefficient of Performance ($COP_C$) plots for chiller conditions ($T_{ev}$=5° C., $T_{ads}$=30° C.) as function of desorption temperature, $T_{des}$ (closed symbols and full lines, left y-axis) and working capacity as volume of liquid water per volume of dry adsorbent, A W, as function of desorption temperature (open symbols, dashed lines, right y-axis) for Co-CUK-1 (■), Ni-CUK-1 (●), and Mg-CUK-1 (▲).

FIG. 13 shows Coefficient of Performance ($COP_C$) plots for chiller conditions ($T_{ev}$=5° C., $T_{ads}$=30° C.) as a function of desorption temperature, $T_{des}$ and working capacity as volume of liquid water per volume of dry adsorbent, AW, as function of desorption temperature for Co-CUK-1, Ni-CUK-1, and Mg-CUK-1. In terms of $COP_C$, Mg-CUK-1 is a very good water adsorbent because it is up to 0.9 at a very low desorption temperature, $T_{des}$=60° C. Such a high $COP_C$ value has never been reported in the literature.

Finally, the water sorption properties and energy storage capacities of CUK-1 and SAPO-34 are summarized in Table 1.

Example 1.6. $H_2O$ Adsorption Characteristics of Mn-CUK-1

Figure 14:
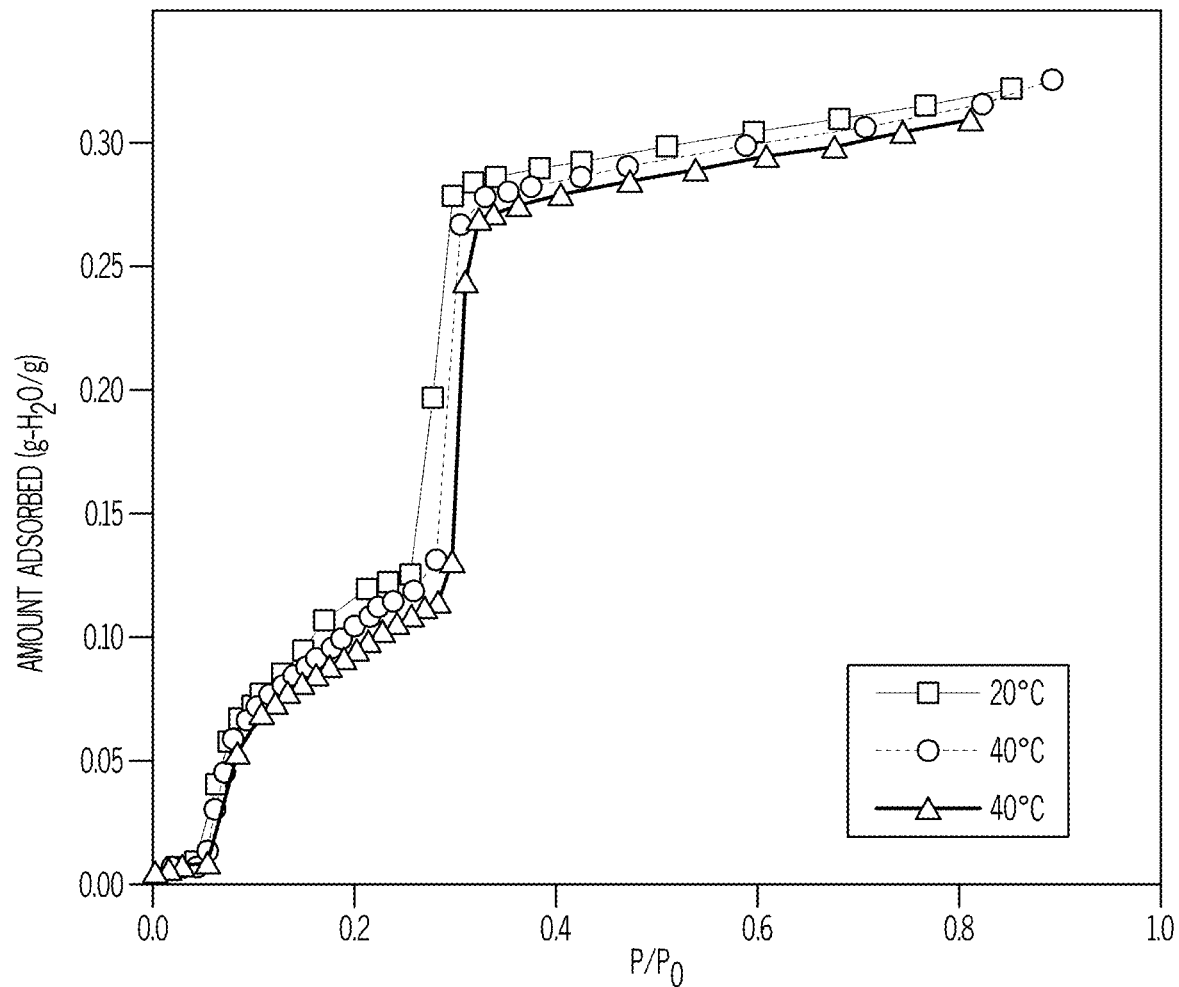
FIG. 14 shows water adsorption isotherms of Mn-CUK-1 as a function of adsorption temperatures.

Water sorption measurements for Mn-CUK-1 were performed by an intelligent gravimetric analyzer (IGA, Hiden Analytical Ltd.). Prior to adsorption experiments, the sample was dehydrated at 100° C. for 1 hour under high vacuum (<$10^{-6}$ Torr). Water adsorption isotherms for Mn-CUK-1 measured at three different temperatures are depicted in FIG. 14. The isotherms show a sigmoidal shape between $P/P_0$=0.05-0.3 ($P_0$=saturation vapor pressure) with two adsorption steps of $P/P_0$=0.05 and $P/P_0$=0.3.

The three isotherms are very similar except a slight difference in the second adsorption step. Most of the water uptake occurs below $P/P_0$=0.4. Furthermore, Mn-CUK-1 exhibits an optimal water equilibrium uptake of 0.22 g/g at 30° C. and $P/P_0$<0.4.

Figure 15:
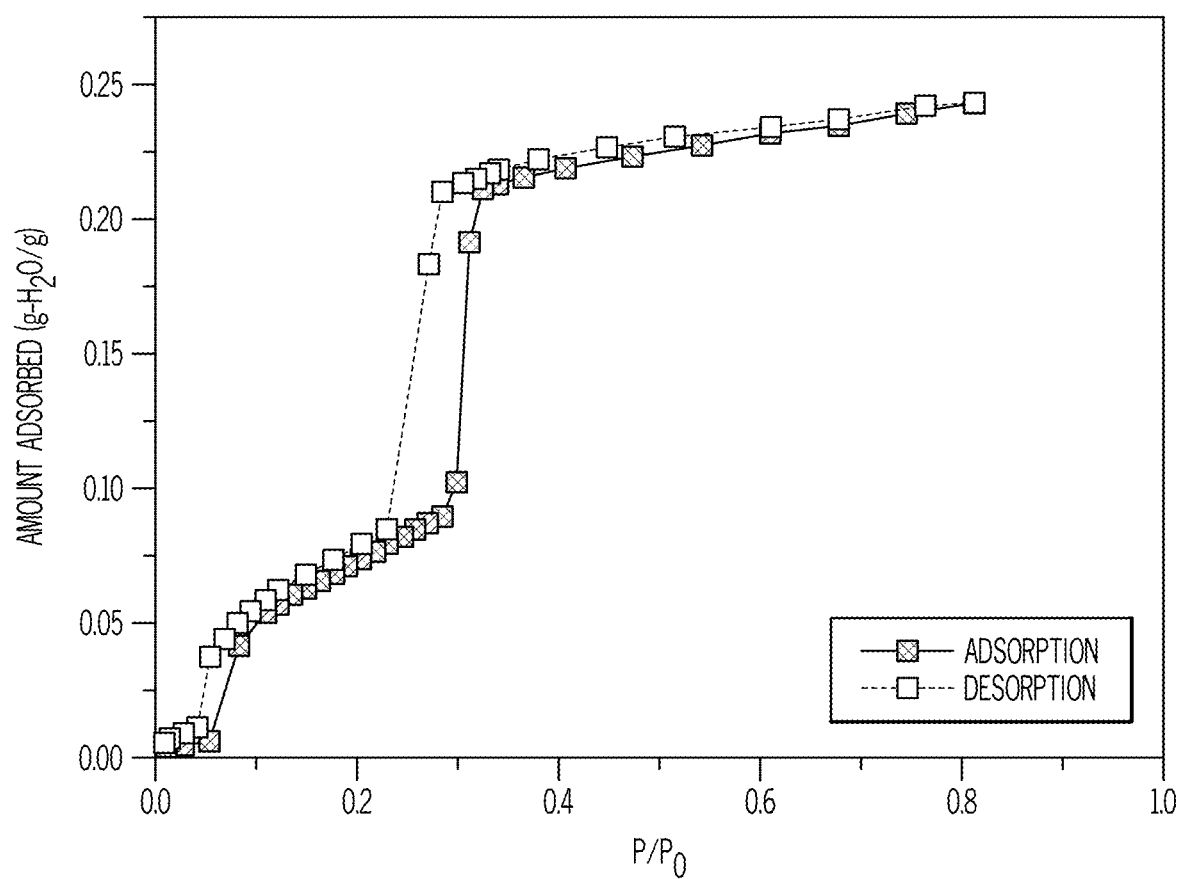
FIG. 15 shows water adsorption-desorption isotherms of Mn-CUK-1 at 40° C.

The adsorption-desorption isotherm of Mn-CUK-1 at 40° C. (FIG. 15) portrays fully reversible water sorption with only a small hysteresis near adsorption steps, which is indicative of facile water cycling regeneration in Mn-CUK-1. X-ray diffraction patterns of Mn-CUK-1 showed no difference before and after water sorption measurements, indicating the hydrolytic stability.

In summary, the experimental results in Example 1.6 indicate that Mn-CUK-1 shows a stepped Type-I adsorption isotherm for water with saturation achieved above 0.4 $P/P_0$. The saturation capacity is in line with the internal surface area of the CUK-1 materials. The behavior below 0.4 $P/P_0$ shows a two-step gating behavior due to partial pore opening in two discrete steps. There is little T dependence. As seen from the 40° C. isotherm, the desorption phase mirrors the adsorption with a slight (ca. 0.05 $P/P_0$) hysteresis.

Additional experimental results are provided in a publication entitled "Porous Metal-Organic Framework CUK-1 for Adsorption Heat Allocation toward Green Applications of Natural Refrigerant Water" (ACS Appl. Mater. Interfaces 2019, 11, 25778-25789). The entirety of the aforementioned publication is incorporated herein by reference.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above,

| Material | Crystal density (g · m$^{-3}$) | Water uptake[a] (g · g$^{-1}$) | (g · cm$^{-3}$) | Working capacity[b] (g · g$^{-1}$) | (g · cm$^{-3}$) | Heat from evaporator[c] (Wh · kg$^{-1}$) | (kWh · m$^3$) | Energy storage capacity[d] (Wh · kg$^{-1}$) | (kWh · m$^3$) |
|---|---|---|---|---|---|---|---|---|---|
| Co-CUK-1 | 1.46 | 0.27 | 0.39 | 0.22 (0.26) | 0.35 (0.38) | 173.6 (180.7) | 253.4 (263.8) | 207 | 302 |
| Ni-CUK-1 | 1.46 | 0.27 | 0.39 | 0.22 (0.26) | 0.12 (0.38) | 177.6 (183) | 259.3 (267.1) | 220 | 321 |
| Mg-CUK-1 | 1.194 | 0.28 | 0.33 | 0.13 (0.25) | 0.15 (0.30) | 94.1 (180.1) | 112.4 (215) | 197 | 236 |
| SAPO-34 | 1.43 | 0.29 | 0.42 | 0.11[e] | 0.16[e] | 115 (120)[e] | 165 (172)[e] | 115[e] | 165[e] |

[a]Water uptake at 30° C. and $P/P_0$ = 0.3;
[b]Working capacity deduced from one refrigeration cycle at $T_{ev}$ = 5° C., $T_{con}$ = 30° C., and $T_{des}$ = 70° C. ($T_{ev}$ = 10° C. for values in the parenthesis);
[c]Heat transferred from the evaporator in one refrigeration cycle at $T_{ev}$ = 5° C., $T_{con}$ = 30° C., and $T_{des}$ = 70° C. ($T_{ev}$ = 10° C. for values in the parenthesis);
[d]Energy storage capacity per unit weight or volume of adsorbent at $T_{ev}$ = 10° C., $T_{con}$ = 30° C., and $T_{des}$ = 70° C.
*$T_{ev}$: evaporation temperature; $T_{con}$: condensation temperature; $T_{des}$: desorption temperature.

Table 1. Water sorption properties and energy storage capacities of CUK-1 and SAPO-34 but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of sorption of $H_2O$ from an environment, wherein the method comprises:
    associating the environment with a porous material,
        wherein the porous material comprises a (M)-2,4-pyridinedicarboxylic acid coordination polymer,
        wherein M is a divalent metal ion selected from the group consisting of Mn, Fe, Co, Ni, Mg, and combinations thereof; and
        wherein the associating results in sorption of the $H_2O$ to the porous material.

2. The method of claim 1, wherein the associating occurs by flowing the environment through a structure that contains the porous materials.

3. The method of claim 1, wherein the associating occurs at room temperature and atmospheric pressure.

4. The method of claim 1, wherein the associating occurs at partial pressures ($P/P_0$) ranging from 0.1 to 0.5, wherein $P_0$ represents a saturated vapor pressure at an association temperature, and wherein P represents a vapor pressure upon association.

5. The method of claim 1, further comprising a step of releasing the sorbed $H_2O$ from the porous material.

6. The method of claim 5, wherein the releasing occurs by decreasing the pressure of the environment.

7. The method of claim 5, wherein the releasing occurs by placing the porous material in a second environment, wherein the second environment has a lower pressure than the environment where $H_2O$ sorption occurred.

8. The method of claim 5, wherein the releasing occurs by decreasing the temperature of the environment.

9. The method of claim 5, wherein the releasing occurs by placing the porous material in a second environment, wherein the second environment has a different temperature than the environment where $H_2O$ sorption occurred.

10. The method of claim 1, wherein the coordination polymer has a one-dimensional pore structure and shows reversible soft-crystal behavior.

11. The method of claim 1, wherein the porous material is a Mg(II) 2,4-pyridinedicarboxylic acid coordination polymer.

12. The method of claim 1, wherein the porous material has a $H_2O$ sorption capacity of more than about 20% of the porous material weight.

13. The method of claim 1, wherein the porous material has a surface area ranging from about 300 $m^2/g$ to about 800 $m^2/g$.

14. The method of claim 1, wherein the porous material has a pore volume ranging from about 0.1 $cm^3/g$ to about 0.5 $cm^3/g$.

* * * * *